United States Patent [19]

Takagi

[11] Patent Number: 5,268,730
[45] Date of Patent: Dec. 7, 1993

[54] AUTOMATIC LIGHT MODULATING CAMERA

[75] Inventor: Tadao Takagi, Yokohama, Japan

[73] Assignee: Nikon Corporation, Tokyo, Japan

[21] Appl. No.: 672,055

[22] Filed: Mar. 13, 1991

[30] Foreign Application Priority Data

| Mar. 19, 1990 [JP] | Japan | 2-69251 |
| Apr. 3, 1990 [JP] | Japan | 2-88898 |
| Apr. 3, 1990 [JP] | Japan | 2-88899 |
| Apr. 3, 1990 [JP] | Japan | 2-88900 |

[51] Int. Cl.$^5$ .................................................. G03B 15/05
[52] U.S. Cl. ....................................... 354/415; 354/432
[58] Field of Search ............. 354/413, 414, 415, 416, 354/417, 432

[56] References Cited

U.S. PATENT DOCUMENTS

| 3,779,141 | 12/1973 | Ueda et al. | 354/416 |
| 4,639,112 | 1/1987 | Nakai et al. | 354/455 |
| 4,705,382 | 11/1987 | Mukai et al. | 354/416 |
| 4,746,947 | 5/1988 | Nakai | 354/402 |
| 4,760,418 | 7/1988 | Ishizaki et al. | 354/415 |
| 4,809,030 | 2/1989 | Takagi et al. | 354/416 |
| 4,951,080 | 8/1990 | Sakamoto et al. | 354/416 |
| 4,965,620 | 10/1990 | Takagi et al. | 354/416 |
| 5,023,647 | 6/1991 | Shiomi et al. | 354/414 |

FOREIGN PATENT DOCUMENTS

| 60-15626 | 1/1985 | Japan . |
| 62-90633 | 4/1987 | Japan . |
| 62-169134 | 7/1987 | Japan . |
| 2067773 | 7/1981 | United Kingdom . |

OTHER PUBLICATIONS

Patent Abstracts of Japan, vol. 10, No. 183 (P-472) Jun. 26, 1986.
Patent Abstracts of Japan, vol. 6, No. 41 (P-106) (919) Mar. 13, 1982.
Patent Abstracts of Japan, vol. 14, No. 286 (P-1064) Jun. 20, 1990.

Primary Examiner—Russell E. Adams
Attorney, Agent, or Firm—Shapiro and Shapiro

[57] ABSTRACT

An automatic light modulating camera effecting a preliminary light emission and a main light emission, extracts effective light metering areas from plural light metering areas based on the light metering signals obtained at the preliminary light emission and on lens signals indicating the states of a phototaking lens at the preliminary light emission, and terminates the main light emission based on the light metering signals obtained in the effective light metering areas.

62 Claims, 13 Drawing Sheets

AUTOMATIC LIGHT MODULATING CAMERA

BACKGROUND OF THE INVENTION

1. Field of the Invention

The present invention relates to a TTL automatic light modulating device for dividing the object field into plural light metering areas and effecting light modulation based on a light metering signal obtained from each of said areas.

2. Related Background Art

The Japanese Laid-open Patent Sho 60-15626 discloses an automatic light modulating camera.

This camera is provided, on the front face thereof, with a flash emission unit for main light emission, an infrared flash unit for preliminary light emission, and a light metering unit for receiving thus emitted lights. Said light metering unit is so constructed as to measure the light reflected from the object, in divided manner in the central area and the peripheral area of the object field.

In this camera, at first the infrared flash emission unit emits infrared light, and the light reflected from the object is measured in the central and peripheral areas of the object field. Based on the difference in the reflected lights, there is identified whether the main object is in the central or peripheral area. According to the result of said identification, the light metering method of said light metering unit is switched to the center priority metering, periphery priority metering or average metering.

Then the flash emission unit emits light in synchronization with the shutter releasing operation. In the course of said light emission, the reflected light from the object is measured in divided manner according to said switched light metering method, and the flash emission unit terminates light emission when the integrated reflected light reaches a predetermined value.

Also the Japanese Laid-open Patent Sho 62-90633 discloses an automatic light modulating camera which does not effect preliminary light emission, but which effects light metering in divided areas of the object field at the main flash emission and controls the amount of main flash emission by the detected maximum value.

In such conventional automatic light modulating cameras, if an article of high reflectance such as a metal screen or a mirror is present behind the main object or if an article is present in front of the main object, the position of the main object cannot be correctly recognized because of the excessively high light metering signal from the area in which such article is located, and the exposure for the main object may become incorrect by the influence of such article.

Also in such conventional automatic light modulating cameras, the main object may be over or under exposed because the light modulating level for terminating the main flash emission is defined to be constant.

SUMMARY OF THE INVENTION

The object of the present invention is to always give an appropriate exposure to the main object at the flash photographing, even in the presence of a highly reflective article in the object field or of an article in front of the main object.

The above-mentioned object can be attained, according to the present invention, by a camera effecting a preliminary light emission and a main light emission, which extracts effective light metering areas from divided plural light metering areas based on the light metering signals obtained at the preliminary light emission and on lens signals indicating the states (for example, diaphragm aperture and object distance) of the phototaking lens at the preliminary light emission, and terminates the main light emission based on the light metering signal obtained in said effective light metering areas.

BRIEF DESCRIPTION OF THE DRAWINGS

FIGS. 5 to 15 illustrate a first embodiment of the present invention, wherein:

FIG. 5 is a schematic cross-sectional view of an automatic light modulating camera of the present invention;

FIG. 6 is a perspective view of a condensing lens array and a divided photosensor element;

FIG. 7 is a view showing positional relationship between the divided photosensor element and film exposure areas;

FIG. 8 is a block diagram of a control system;

FIG. 9 is a block diagram of a light modulating circuit;

FIG. 10 is a flow chart of the main control sequence;

FIGS. 11 to 15 are flow charts of the subroutines;

DESCRIPTION OF THE PREFERRED EMBODIMENTS

FIGS. 1 to 4 are diagrams showing pertinent portions of cameras according to the present invention.

Figure 1:
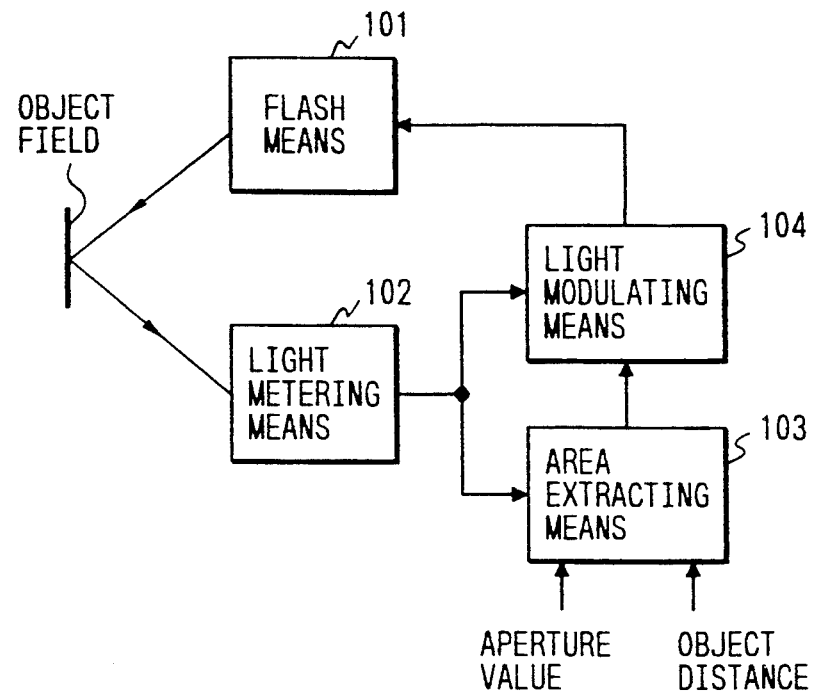
FIGS. 1 to 4 are diagrams showing pertinent portions of cameras according to the present invention.

Referring to FIG. 1, a TTL automatic light modulating camera is provided with flash means 101 capable of a main light emission for flash photographing of the object field and a preliminary light emission for detecting the reflective factor distributions of the object field prior to the main light emission; light metering means 102 for dividing the object field into plural areas, metering the reflected light from each of said plural areas at the main and preliminary light emissions by said flash means 101, and outputting corresponding light metering signals; area extracting means 103 for extracting effective light metering areas from said divided plural areas, based on the light metering signals obtained at the preliminary light emission and on the diaphragm aperture and object distance of the phototaking lens at said preliminary light emission; and light modulating means 104 for terminating said main light emission according to the light metering signals obtained in said effective light metering areas extracted by the area extracting means 103.

Also embraced by FIG. 1 is a TTL automatic light modulating camera is provided with flash means 101 for emitting light for flash photographing of the object field; light metering means 102 for dividing the object field into plural areas, metering the reflected light from each of said plural areas at the light emission by the flash means 101, and outputting corresponding light metering signals; area extracting means 103 for extracting effective light metering areas from said divided plural areas, based on the light metering signals obtained in an initial stage of the light emission and on the diaphragm aperture and object distance of the phototaking lens at the light emission; and light modulating means 104 for terminating the light emission according to the light metering signals obtained in the effective light metering areas extracted by said area extracting means 103.

Figure 2:
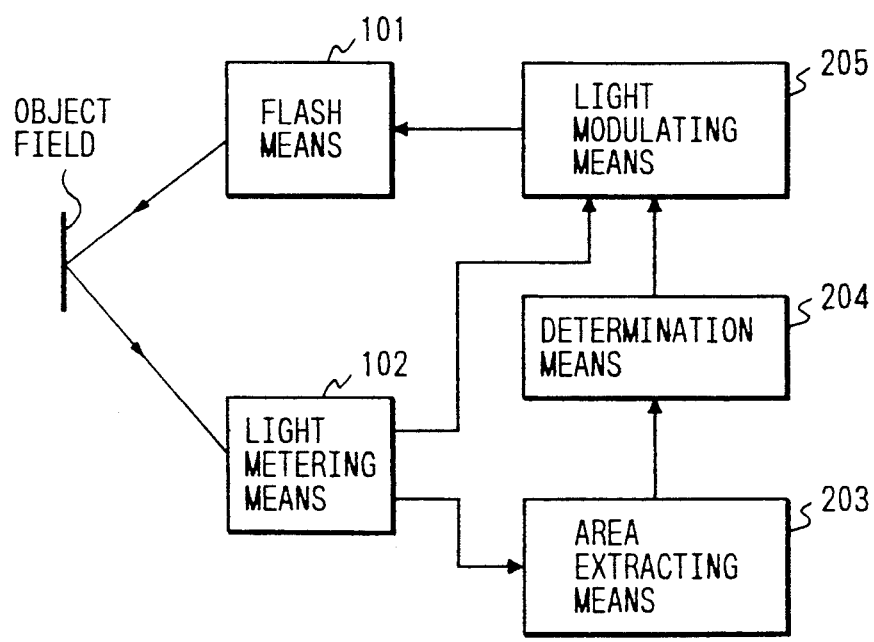

Referring to FIG. 2, a TTL automatic light modulating camera is provided with flash means 101 capable of a main light emission for flash photographing of the object field and a preliminary light emission prior to said main light emission; light metering means 102 for dividing the object field into plural areas, metering the reflected light from each of said divided plural areas at the preliminary and main light emissions by the flash means 101 and outputting corresponding light metering signals; area extracting means 203 for extracting effective light metering areas from said divided plural areas, based on the light metering signals obtained at the preliminary light emission; determination means 204 for determining a light modulating level according to the size of the extracted effective light metering areas; and light modulating means 205 for terminating the main light emission when a predetermined light modulation evaluation factor, cumulatively calculated according to the light metering signals from the effective light metering areas, reaches the determined light modulating level in the course of the main light emission.

Also embraced by FIG. 2 is a TTL automatic light modulating camera provided with flash means 101 for flash photographing of the object field; light metering means 102 for dividing the object field into plural areas, metering the reflected light from each of said plural areas at the light emission by said flash means 101 and releasing corresponding light metering signals; area extracting means 203 for extracting effective light metering areas from said divided plural areas, based on the light metering signals obtained in an initial stage of the light emission; determination means 204 for determining a light modulating level according to the size of the extracted effective light metering areas; and light modulating means 205 for terminating the light emission when a predetermined light modulation evaluation factor, cumulatively calculated according to the light metering signals from the effective light metering areas, reaches the determined light modulating level.

Figure 3A:
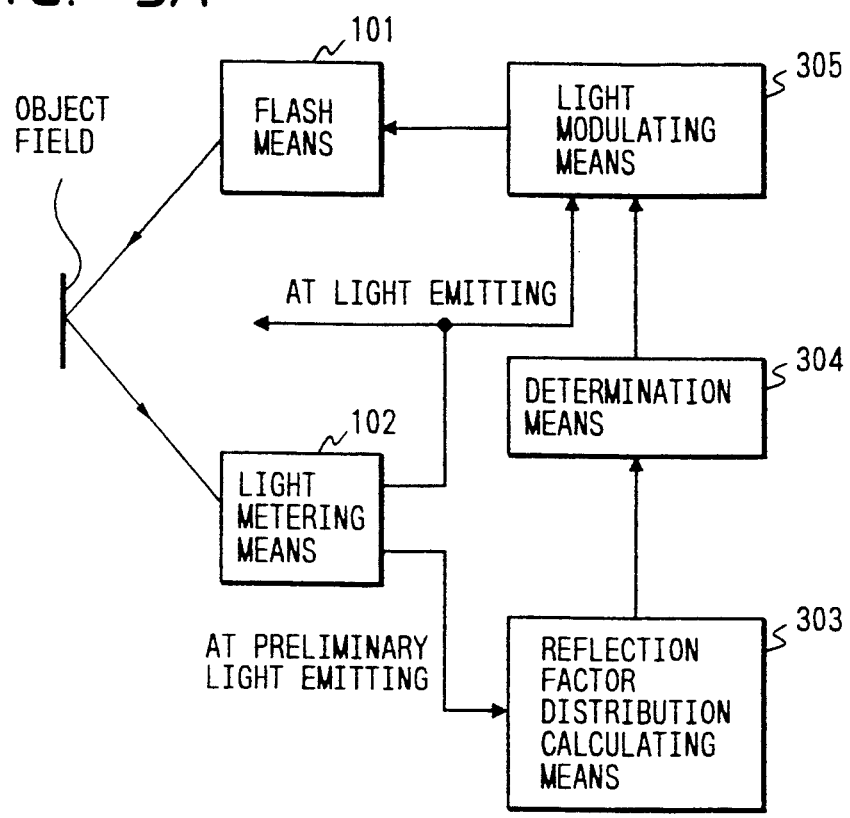

Referring to FIG. 3A, a TTL automatic light modulating camera is provided with flash means 101 capable of a main light emission for flash photographing of the object field and a preliminary light emission for detecting the reflection factor distribution of the object field prior to the main light emission; light metering means 102 for dividing the object field into plural areas, metering the reflected light from each of said plural areas at the preliminary and main light emissions by the flash means 101, and outputting corresponding light metering signals; reflection factor distribution calculating means 103 for calculating the reflection factor distributions in the plural areas of the object field, based on the light metering signals obtained at the preliminary light emission; determination means 204 for determining a light modulating level based on the calculated reflection factor distributions; and light modulating means 305 for terminating the main light emission when a predetermined light modulation evaluation factor, cumulatively calculated according to the light metering signals, reaches said determined light modulating level in the course of the main light emission.

Figure 3B:
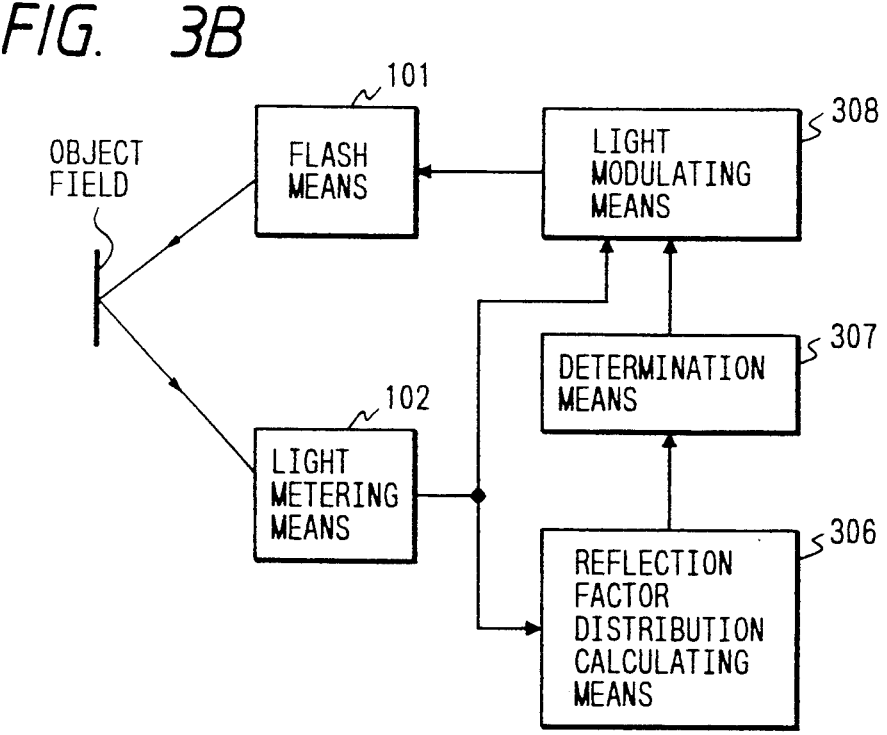

Referring to FIG. 3B, a TTL automatic light modulating camera is provided with flash means 101 for emitting light for flash photographing of the object field; light metering means for dividing the object field into plural areas, metering the reflected light from each of the plural areas at the light emission by said flash means 101 and outputting corresponding light metering signals; reflection factor distribution calculating means 306 for calculating the reflection factor distributions in the plural areas of the object field, based on the light metering signals obtained in an initial stage of the light emission; determination means 307 for determining a light modulating level, based on the calculated reflection factor distributions; and light modulating means 308 for terminating the light emission when a predetermined light modulation evaluation factor, cumulatively calculated according to the light metering signals, reaches the determined light modulating level after the initial stage of the light emission.

Figure 4:
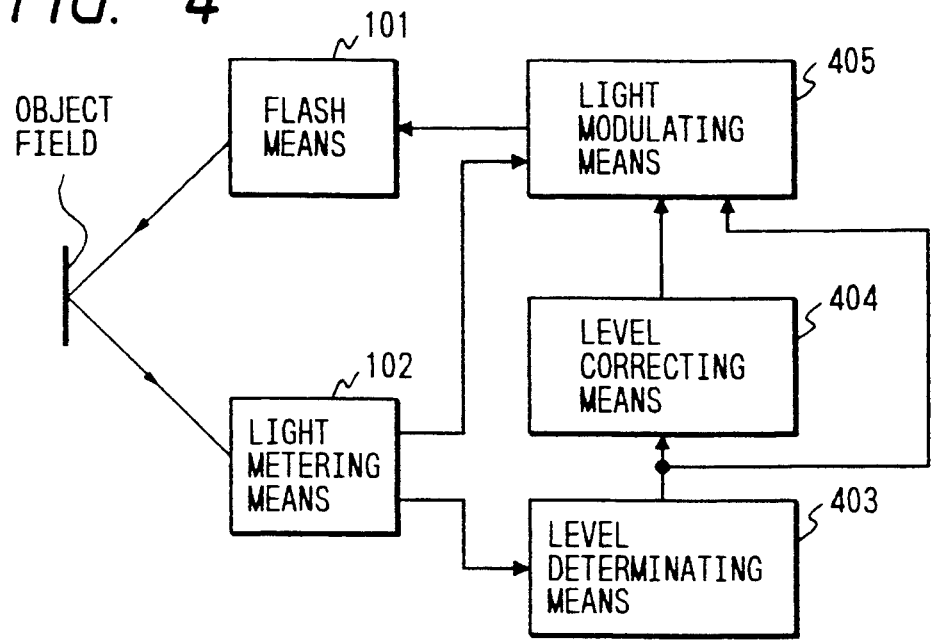

Referring to FIG. 4, a TTL automatic light modulating camera is provided with flash means 101 capable of a main light emission for flash photographing of the object field and a preliminary light emission prior to the main light emission; light metering means 102 for dividing the object field into plural areas, metering the reflected light from each of said plural areas at the preliminary and main light emissions by the flash means 101 and outputting corresponding light metering signals; level determination means 403 for determining a light modulating level based on the light metering signals at the preliminary light emission; level correcting means 404 for correcting the determined light modulating level into a predetermined range if said level is outside said range; and light modulating means 405 for terminating the main light emission when a predetermined light modulation evaluation factor, cumulatively calculated according to the light metering signals, reaches said determined or corrected light modulating level in the course of the main light emission.

Also embraced by FIG. 4 is a TTL automatic light modulating camera is provided with flash means 101 for emitting light for flash photographing of the object field; light metering means 102 for dividing the object field into plural areas, metering the reflected light from each of said plural areas at the light emission by the flash means 101 and releasing corresponding light metering signals; level determination means 403 for determining a light modulating level according to the light metering signals obtained at an initial stage of the light emission; level correcting means 404 for correcting the light modulating level into a predetermined range if said level is outside said range; and light modulating means 405 for terminating the light emission when a predetermined light modulation evaluation factor, cumulatively calculated according to the light metering signals, reaches said determined or corrected light modulating level after the initial stage of the light emission.

The term reflection factor distribution means the distribution of reflectance when reflective objects in the object field are assumed to be at a same object distance, and is obtained, in the embodiments of the present invention, by detecting the distribution of light reflected from the object field through divided metering of the reflected light therefrom.

In the following there will be explained a first embodiment of the present invention, with reference to FIGS. 5 to 15.

Figure 5:
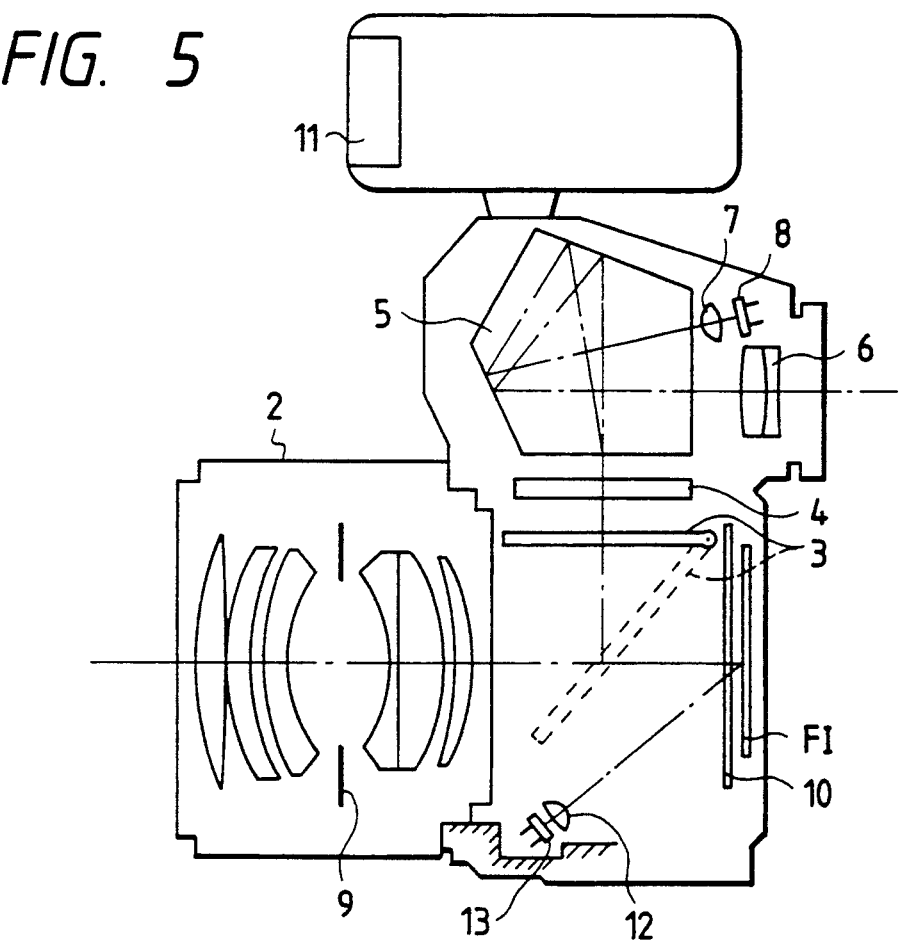

FIG. 5 is a cross-sectional view of a TTL automatic light modulating camera. A light beam transmitted by a phototaking lens 2 is reflected by a mirror 3 in a broken-lined lowered state, then transmitted by a focusing screen 4 and a pentagonal prism 5, partly guided to an eyepiece lens 6 and partly guided to a light-metering element 8 for exposure calculation through a condenser lens 7. When a shutter release button (not shown) is depressed, the mirror 3 is shifted to a solid-lined lifted position. Then, a diaphragm 9 is closed to a predetermined aperture and a shutter 10 is opened and closed, whereby a film FI is exposed to the light coming from the object through the phototaking lens 2.

In the flash photographing operation, an electronic flash device 11 effects a main light emission to illuminate the object after the shutter 10 is opened. The light reflected from the object reaches the film through the phototaking lens 2, then is reflected by said film and reaches a light modulating photosensor element 13 through a condensing lens array 12. The camera of the present embodiment is also capable of a preliminary light emission, prior to said main light emission, for detecting the reflection factor distribution in the object field. The light reflected from the object field, at said preliminary light emission, is reflected by the shutter blinds before the opening of the shutter and received by the photosensor element 13.

Figure 6:
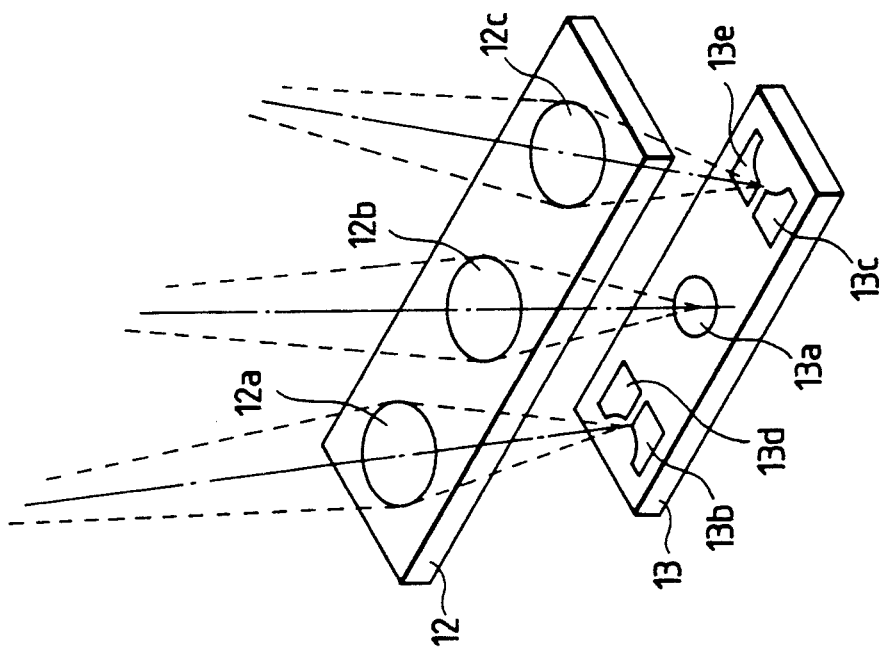

As shown in FIG. 6, said photosensor element 13 is divided into a photosensor element 13a corresponding to a circular light metering area at the center of the object field, and photosensor elements 13b-13e corresponding to light metering areas of a rectangular form eclipsed by an arc, at the peripheral portion of the object field, all elements being positioned on the same plane. Thus, in the present embodiment, the light metering is conducted in five division areas of the object field by the preliminary light emission prior to the main light emission. The condensing lens array 12 is an optical member having three lens portions 12a-12c respectively corresponding to the left, central and right blocks of said photosensor elements 13a-13e.

Figure 7:
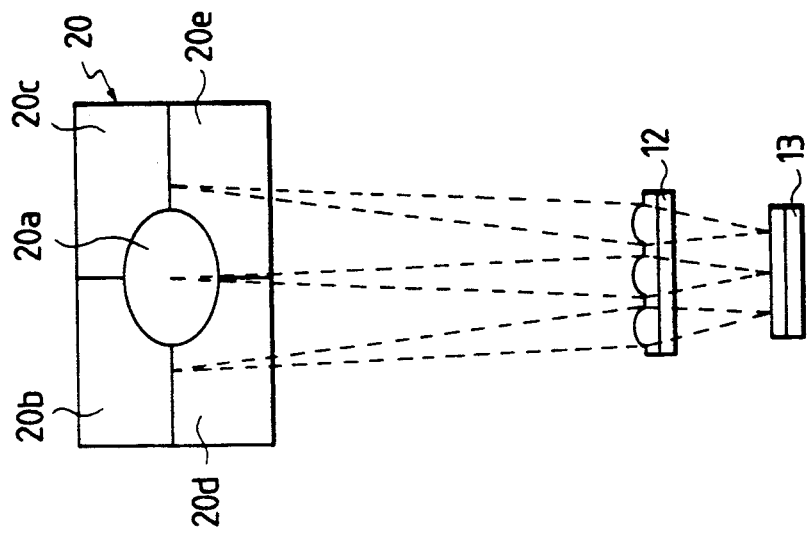

FIG. 7 illustrates the optical positional relationship among an exposure area 20 on the film, the photosensor element 13 and the condensing lens array 12. When the exposure area 20 of a frame on the film is divided into five areas, consisting of a circular central area 20a and four peripheral areas 20b-20e, in the same manner as in the object field, the left, central and right blocks of the photosensor elements 13a-13e shown in FIG. 6 respectively correspond, as indicated by broken lines in FIG. 7, to the left, central and right areas of said exposure area 20 through three lens portions 12a-12c of the condensing lens array 12. The five photosensor elements 13a-13e respectively correspond, in shape, to the areas 20a-20e of the exposure area 20 and can therefore measure the luminances in said areas.

Figure 8:
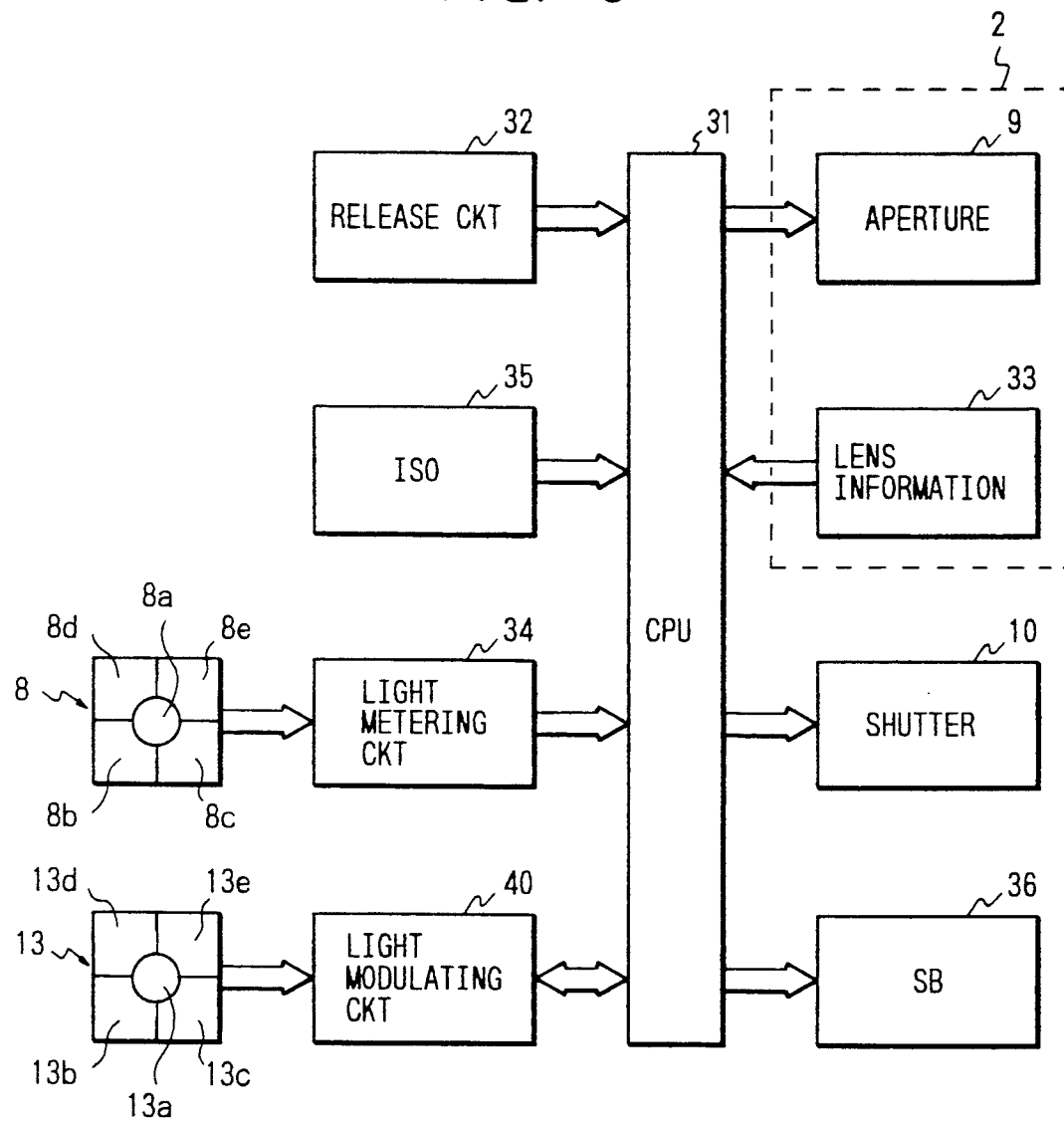

FIG. 8 is a block diagram of a control system. A CPU 31 for controlling the sequence of the entire camera is connected to a release circuit 32 for the shutter release button, a control circuit for the shutter 10, a control circuit for the diaphragm 9 and a lens information output circuit 33 provided in the phototaking lens 2. Said CPU 31 is further connected to a light metering circuit 34 for effecting the light metering according to the output from the exposure controlling photosensor element 8, a light modulating circuit 40 for effecting light modulation according to the outputs from the photosensor elements 13a-13e, an ISO sensitivity detecting circuit 35 for reading the ISO sensitivity of the loaded film FI from a DX code, and a light emission control circuit 36 for said electronic flash device 11. Said electronic flash device 11 is either incorporated in the camera body or detachably mounted thereon.

The exposure controlling photosensor element 8 is composed, like the photosensor element 13, of five photosensor elements 8a-8e corresponding to the light metering areas in the object field. The lens information output circuit 33 is composed of a lens ROM storing information specific to the lens (fully-open aperture value, exit pupil distance etc.), and a lens encoder for detecting the object distance from the focus position of the phototaking lens 2.

Figure 9:
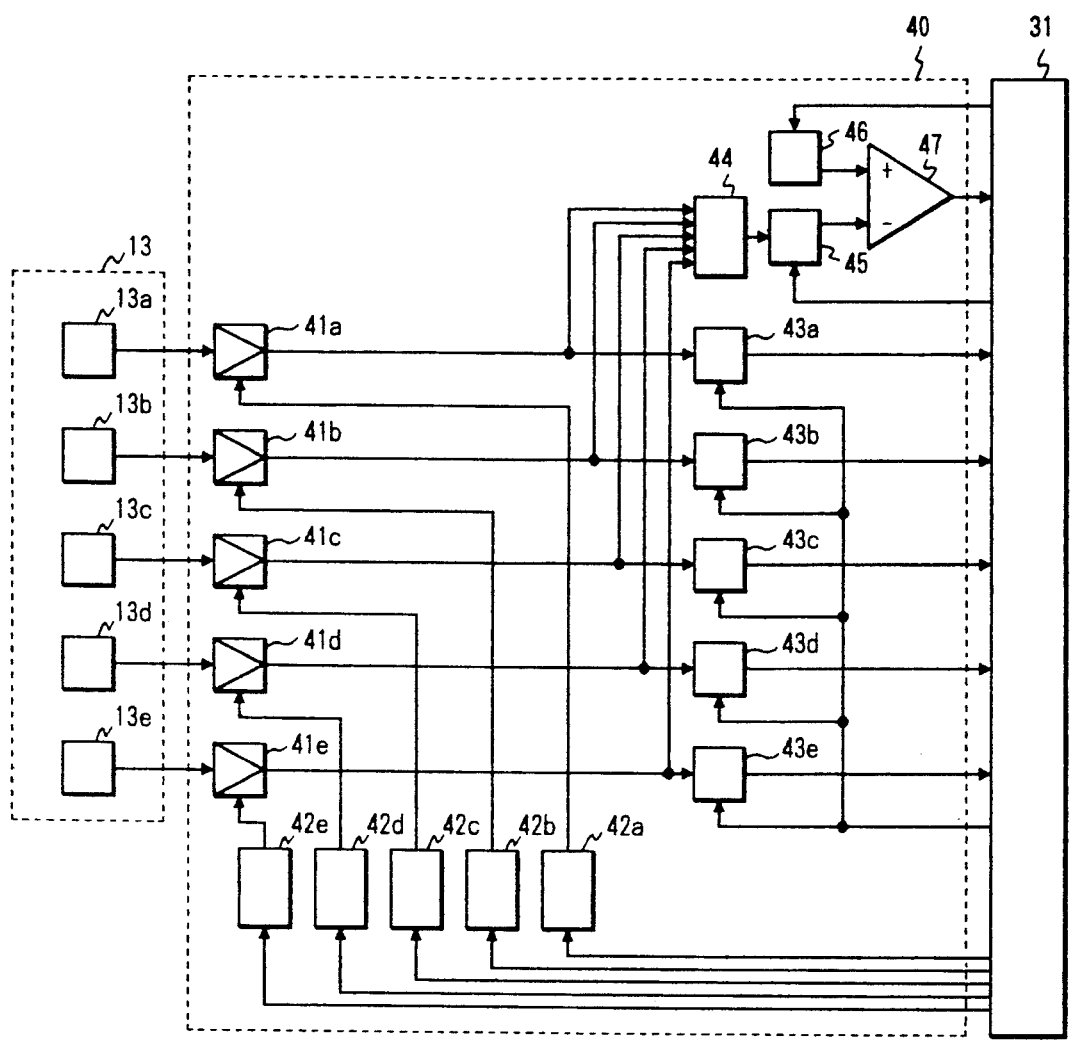

FIG. 9 shows the details of said light modulating circuit 40, including amplifiers 41a-41e for amplifying the outputs of the photosensor elements 13a-13e; and gain setters 42a-42e for setting the gains of said amplifiers 41a-41e in response to instructions from the CPU 31 and respectively including D/A converters for converting digital signals from said CPU 31 into analog signals.

There are further provided integrating circuits 43a-43e for integrating in time the outputs of said amplifiers 41a-41e at said preliminary light emission, in response to an instruction from said CPU 31; an adding circuit 44 for adding the outputs of the amplifiers 41a-41e at the main light emission; an integrating circuit 45 for integrating in time the result of addition obtained by said adding circuit 44, in response to an instruction from the CPU 31; a converting circuit 46 for converting a light modulating level (to be explained later in more detail) released in the form of a digital signal by the CPU 31 into an analog signal; and a comparator 47 for comparing thus converted light modulating level with the output of said integrating circuit 45 and releasing a light emission stop signal when said output of the integrating circuit 45 reaches said light modulating level.

In the following there will be explained the control sequence of the CPU 31 in a flash photographing operation, with reference to the flow charts shown in FIGS. 10 to 15.

Figure 10:
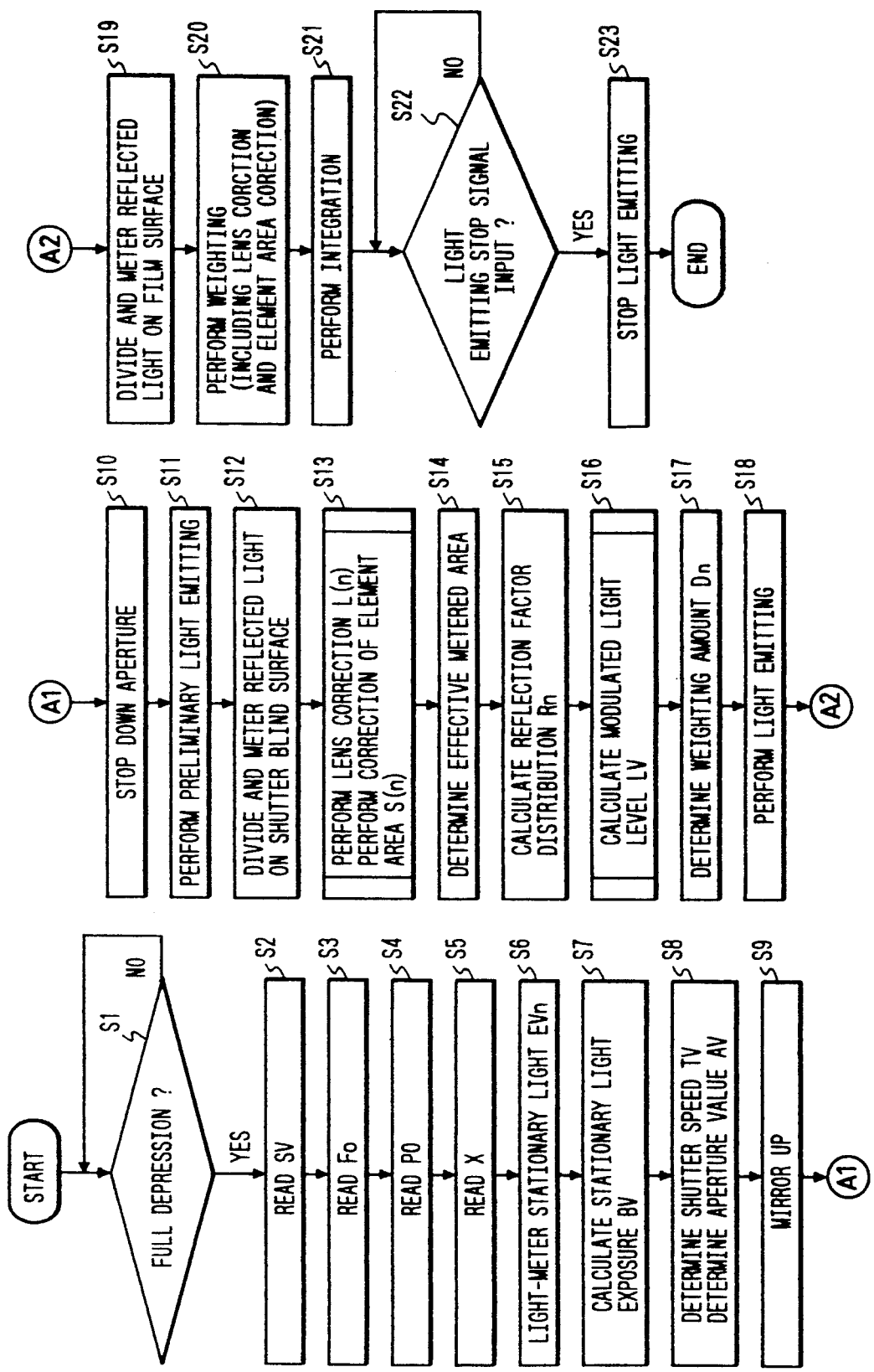

FIG. 10 shows a main flow chart. When the shutter release button is fully depressed in a step S1, in succession to a half-stroke depression, a sequence starting from a step S2 is activated. At first a step S2 reads the ISO sensitivity SV of the loaded film, from the ISO sensitivity detecting circuit 35. Then steps S3-S5 read the fully-open aperture value $F_0$, exit pupil distance $P_0$ and object distance x from the lens information output circuit 33 of the phototaking lens 2, and the sequence proceeds to a step S6. The object distance x is obtained by detecting, with the encoder, the position of the phototaking lens driven in response to the half-stroke depression of the shutter release button 32.

The step S6 executes light metering under the stationary light. More specifically the outputs of the aforementioned divided photosensor elements 8a-8e (FIG. 8) are fetched by the light metering circuit 34, which thus reads the logarithmically compressed brightness values EVn (n=1-5) corresponding to the light metering areas. In the present embodiment, the values n (1-5) respectively correspond to the photosensor elements 8a-8e or 13a-13e. Then a step S7 calculates an exposure BV for stationary light, based on the brightness values EVn and the ISO sensitivity SV, for example according to a method disclosed in commonly assigned U.S. Pat. No. 4,965,620.

Then a step S8 determines the shutter speed TV and the aperture value AV from thus calculated stationary light exposure BV, and a step S9 lifts the mirror 3 from the broken-lined state shown in FIG. 5 to the solid-lined state. Then a step S10 closes the diaphragm 9 to an aperture determined in the step S8, and a step S11 sends a light emission signal to the light emission control circuit 36 to cause the electronic flash device 11 to effect the preliminary light emission with a predetermined small guide number $G_{NO}$.

The light of said prelimination light emission is reflected by the object, then transmitted by the phototaking lens 2, and is focused as a primary image on the blinds of the shutter 10. Said primary image is divided in five portions, which are respectively received by the divided photosensor elements 13a–13e through the condensing lens array 12 shown in FIG. 6. Said photosensor elements 13a–13e send in succession signals, corresponding to the amounts of received light, to the amplifiers 41a–41e of the light modulating circuit 40 shown in FIG. 9.

The amplifiers 41a–41e amplify the input signals with gains set by the gain setters 42a–42e (said gains being all "1" at the preliminary light emission), for supply to the integrating circuits 43a–43e. In a step S12, the CPU 31 sends an activation signal to the integrating circuits 43, which in response respectively integrate said amplified signals in time and supply the CPU 31 with the integrated signals, which will be hereinafter called divided light metering signals BPn (n=1–5).

Thereafter the CPU 31 executes steps S13–S17 in succession, of which details are shown in FIGS. 11 to 15.

Figure 11:
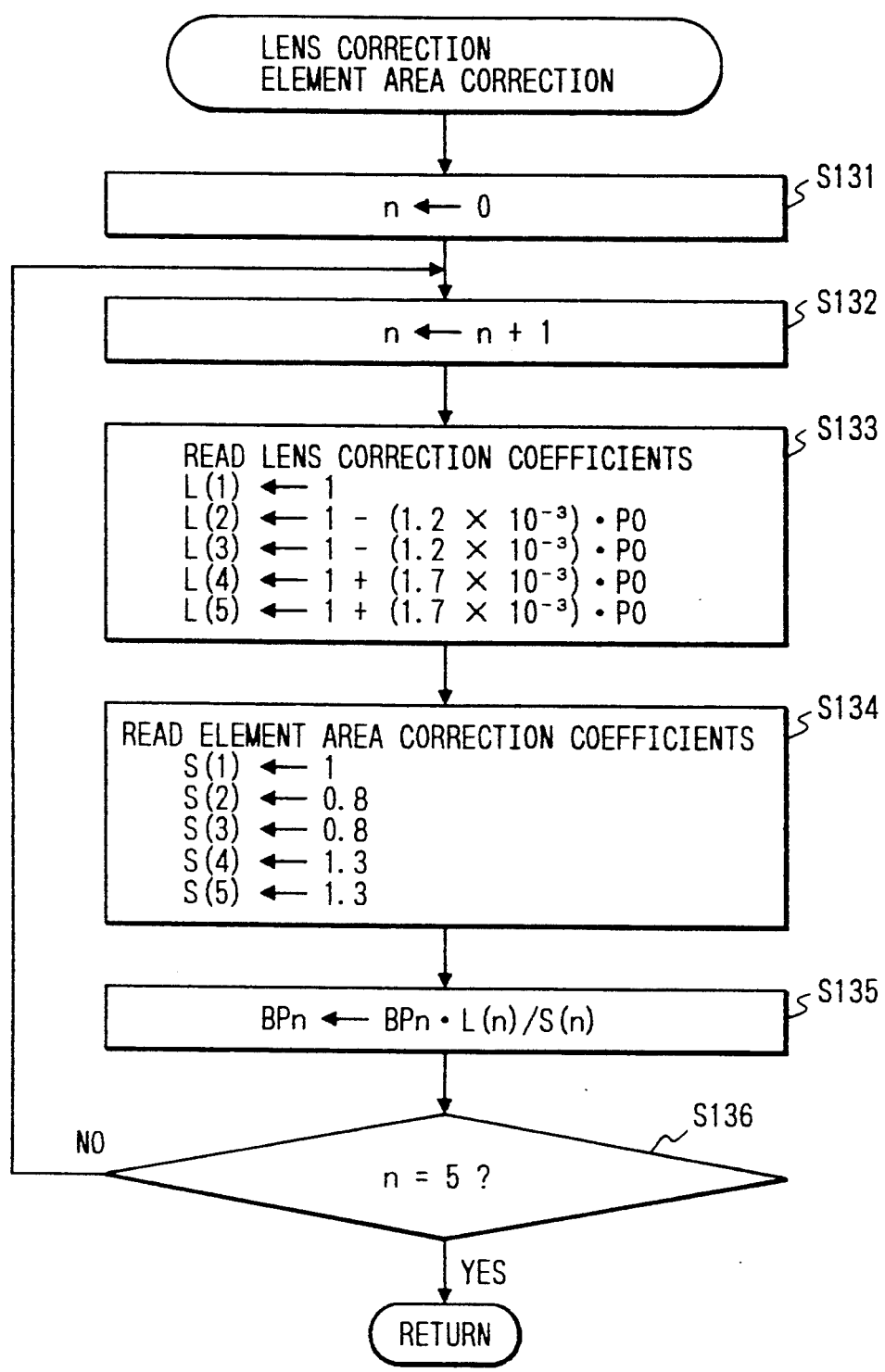

FIG. 11 shows the details of a correction subroutine for lens and element size (step S13 in FIG. 10) for said divided light metering signals BPn. At first a step S131 sets a condition n=0. Then a step S132 stepwise increases the value n by "1", and a step S133 calculates lens correction coefficients L(n) according to the following equations:

$$L(1) = 1$$

$$L(2) = 1 - (1.2 \times 10^{-3}) \cdot PO$$

$$L(3) = 1 - (1.2 \times 10^{-3}) \cdot PO$$

$$L(4) = 1 + (1.7 \times 10^{-3}) \cdot PO$$

$$L(5) = 1 + (1.7 \times 10^{-3}) \cdot PO$$

wherein PO is the exit pupil distance of the phototaking lens 2. Then a step S134 reads the element area correction coefficients S(n) stored in advance in the memory, namely S(1)=1, S(2)=0.8, S(3)=0.8, S(4)=1.3 and S(5)=1.3. Then a step S135 corrects the divided light metering signals BPn according to a principle:

BPn←BPn L(n)/S(n).

This operation is repeated until n=5 is identified in a step S136, whereby the corrections for the lens and the element size are conducted for all the divided light metering signals BPn of five light metering areas.

The light-receiving conditions of said photosensor elements 13a–13e vary, depending on the exit pupil distance PO of the phototaking lens 2 and the size and position of said photosensor elements. The above-explained corrections in the subroutine shown in FIG. 11 are conducted in order to evaluate the light metering signals of all the photosensor elements under the same condition.

Figure 12:
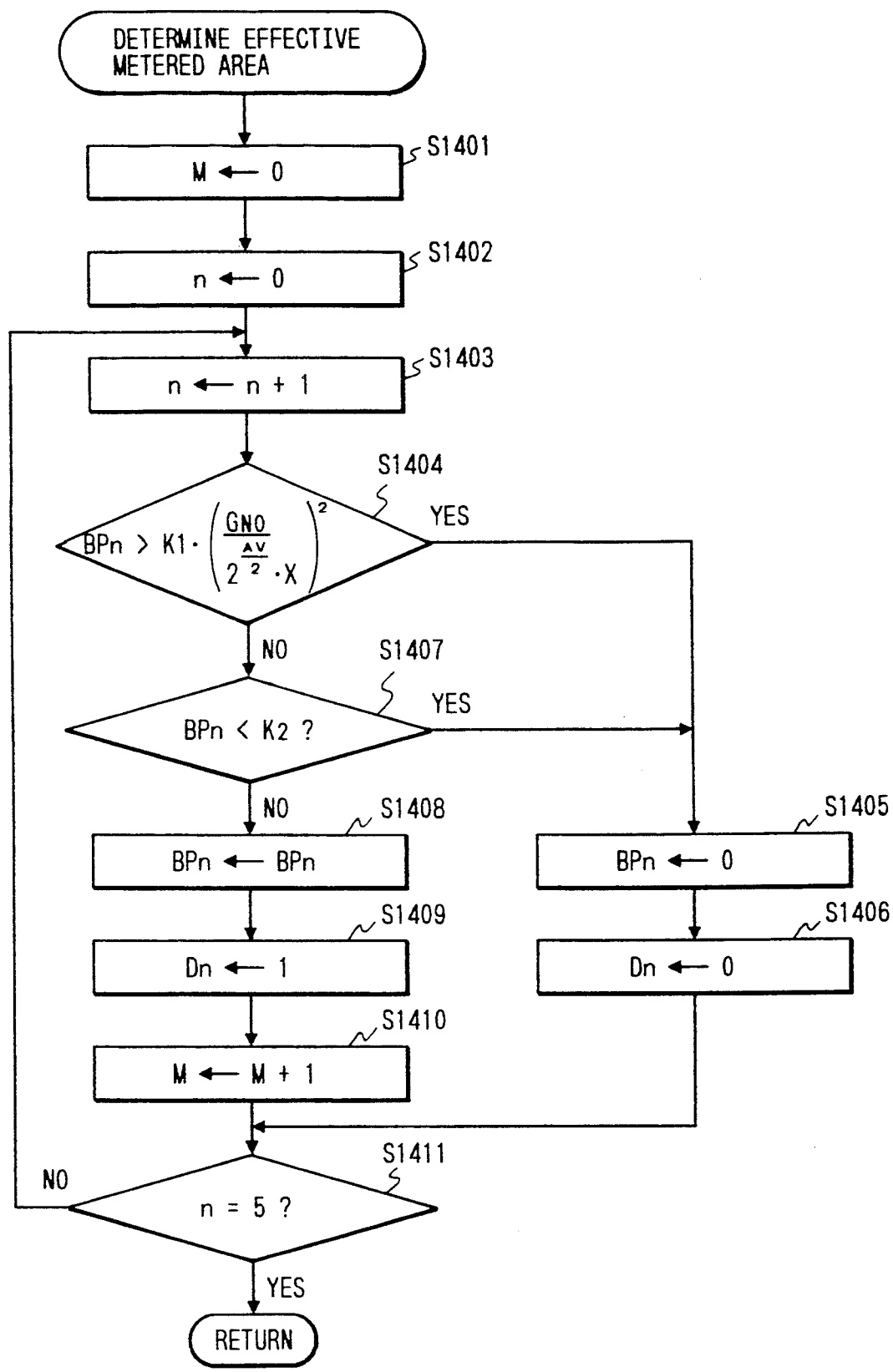

Then, in a step S14 (FIG. 10), the CPU 31 executes an effective light metering area determination (high/low cut subroutine), of which details are shown in FIG. 12. At first, steps S1401, S1402 set conditions M=0, n=0 and steps S1403–S1410 then execute following processes in succession on said five divided light metering signals BPn, corrected in the step S13.

A step S1404 discriminates whether the divided light metering signal satisfies a condition:

$$BPn > K1 \cdot \left( \frac{G_{NO}}{2^{\frac{AV}{2}} \cdot x} \right)^2$$

wherein $G_{NO}$ is the guide number at the preliminary light emission, AV is the aperture value (apex value) calculated in the foregoing step 8, x is the photographing distance, and K1 is a constant. If the discrimination of the step S1404 turns out affirmative, a step S1405 sets said divided light metering signal to zero, then a step S1407 sets the weight Dn for said light metering signal BPn also to zero, and the sequence proceeds to a step S1411.

The meaning of said steps S1404–S1406 is as follows. If an article of high reflectance, such as a metal screen or a mirror, is present in the object field, or if an article is present in front of the main object, the divided light metering signal BPn of the area of such article is extremely large in comparison with that of other objects, so that the main object may be under exposed if the light modulation is conducted based on said light metering signal. Therefore, the above-explained steps S1404–S1406 are to exclude the light metering signal corresponding to such article of high reflectance from the ensuing light modulating operation. More specifically, if the light metering signal BPn is larger than a reference value:

$$K1 \cdot \left( \frac{G_{NO}}{2^{\frac{AV}{2}} \cdot x} \right)^2$$

the light amount is identified as excessively large, and said light metering signal BPn and the corresponding weight Dn are both set at zero. This operation brings about following effects, since said reference value is determined from the aperture value AV and photographing distance x at the preliminary light emission.

Even if the preliminary light emission is conducted with a constant guide number, the light metering signal varies depending on the aperture value AV and photographing distance x, and becomes smaller as the distance is longer or as the aperture is smaller. On the other hand, if a constant reference value is adopted, an article to be excluded may be overlooked under a condition of a long distance or a small aperture, and a significant light metering signal may be excluded at a short distance or a large aperture.

These drawbacks can be completely avoided in the present embodiment, because said reference value is defined by the above-explained equation and becomes larger as the phototaking distance becomes shorter or as the aperture value is closer to the fully-open aperture.

If the discrimination of the step S1404 turns out negative, the sequence proceeds to a step S1407 to discriminate whether the light metering signal BPn is smaller than a reference value K2. Depending whether it is smaller or not, the sequence respectively proceeds to the above-mentioned step S1405 or a step S1408. This procedure serves in case the light metering signal BPn is excessively low (for example, by a low reflection from a large space behind the main object), to eliminate such signal BPn and thereby prevent the over exposure of the main object. In this case, as the original light metering signal BPn is weak, the reference value need not be vaired according to the aperture value AV or the photographing distance x but can be constant.

The light metering signals BPn not eliminated in the step S1404 or S1407 are adopted in the original values in a step S1408, and a step S1409 selects the weighting coefficients of "1" for said signals. Then a step S1410 stepwise increases the variable M by "1". Among five light metering areas in the object field, those of which light metering signals BPn have not been eliminated constitute effective light metering areas. The variable M indicates the number of the unelimimated light metering signals BPn, or the number of the effective light metering areas.

After the subroutine shown in FIG. 12, the sequence proceeds to a step S15 (FIG. 10) for determining the reflection factor distribution Rn of the light metering areas in the object field.

Figure 13:
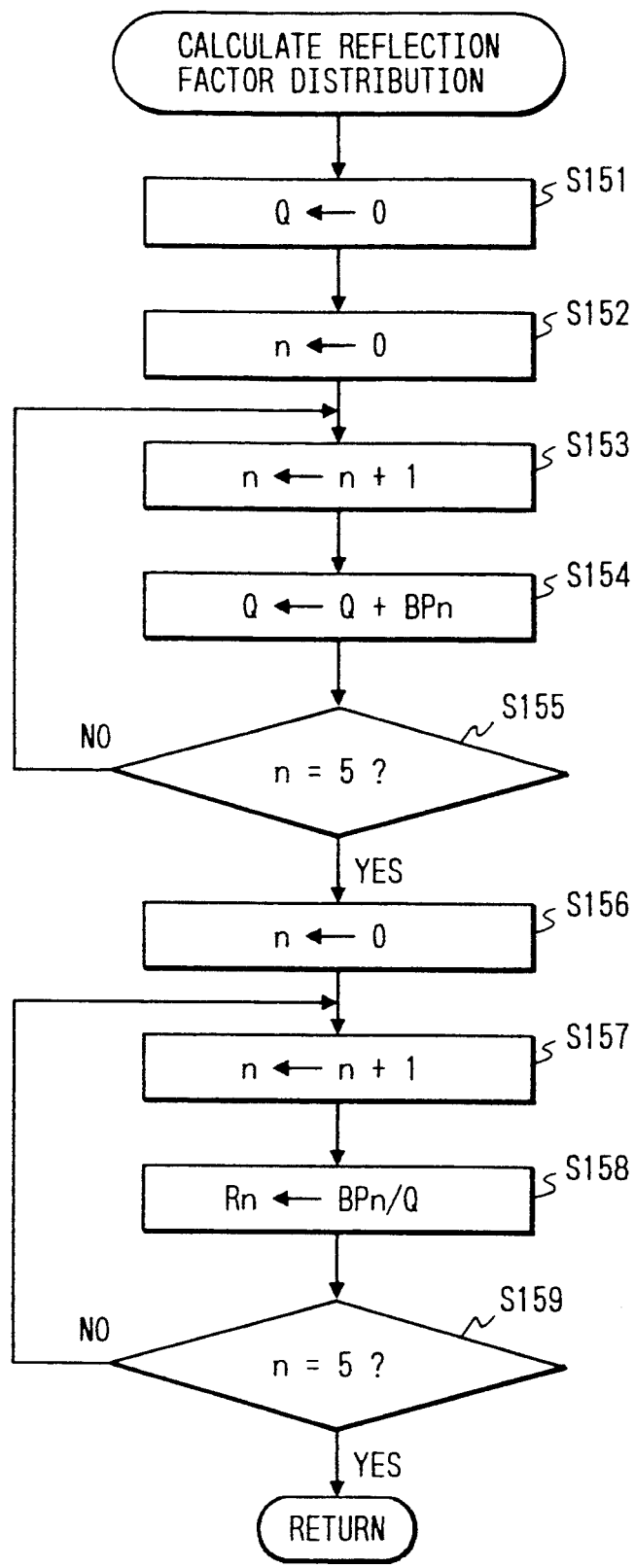

FIG. 13 shows the details of said step S15. At first, steps S151, S152 set conditions Q=0 and n=0. Then steps S153-S155 determine the sum Q of the light metering signals BPn (Q=Q+BPn). As the excessively strong or weak light metering signals have been set to zero in the step S14, said sum practically includes only the light metering signals of the effective light metering areas. Then a step S156 sets n=0, and steps S157-S159 determine the reflection factor distribution Rn of each light metering signal BPn when the sum of reflection factor of said signals BPn is normalized to "1", according to an equation:

$$Rn = BPn/Q.$$

In this operation, the reflection factor distribution of a light metering signal excluded in the step S14 becomes naturally to zero.

Then the sequence proceeds to a step S16 (FIG. 10) for calculating the light modulating level, which means the level of the light metering signal for terminating the main light emission of the electronic flash device 11 at the flash phototaking operation.

Figure 14:
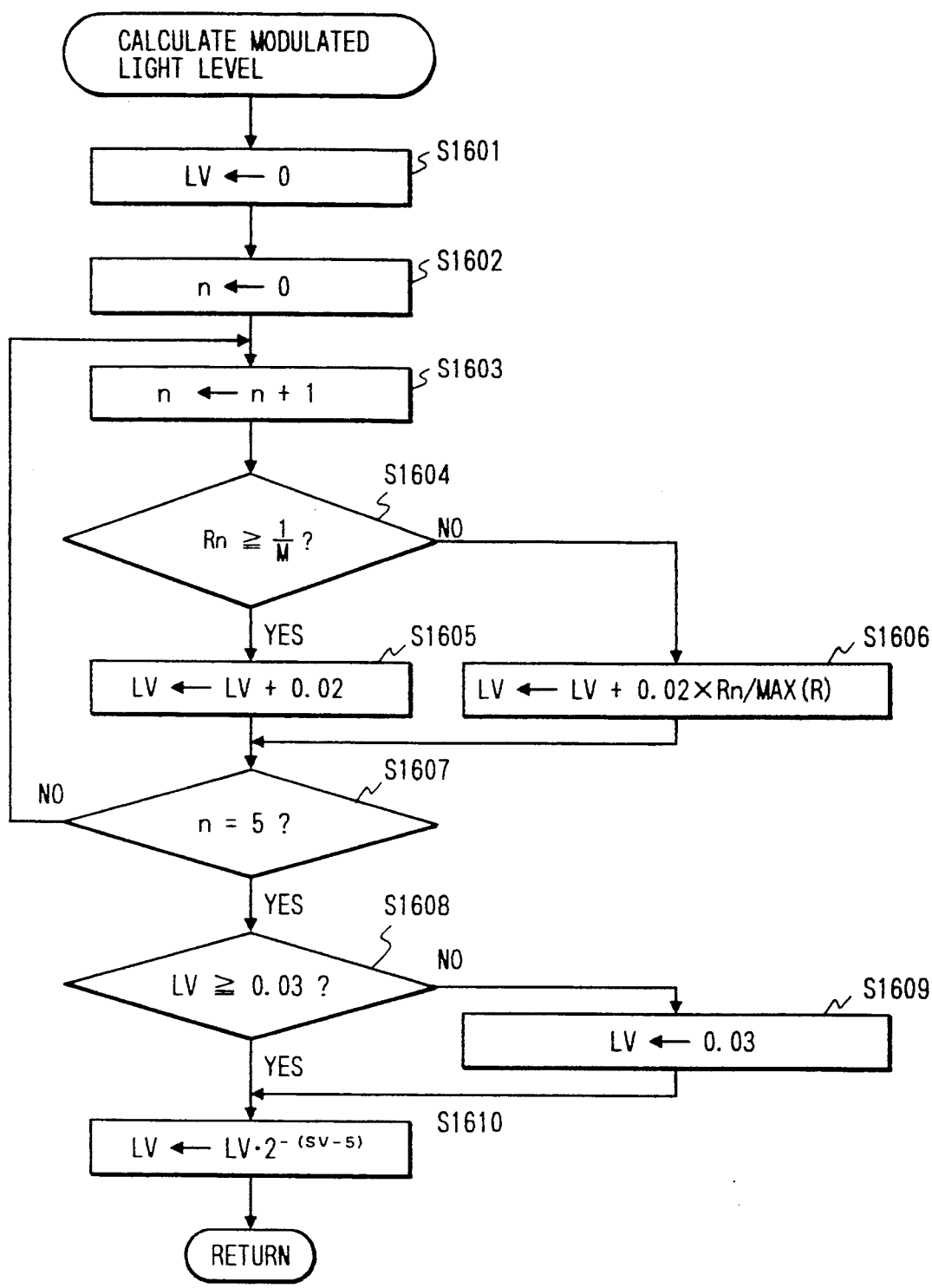

Now referring to FIG. 14 showing the details of said step S16, at first a step S1601 sets the light modulating level LV to zero, and a step S1602 sets a condition n=0. Then, subsequent steps S1603-S1606 determine the light modulating level LV according the number M of the effective light metering areas and the reflection factor distribution thereof.

More specifically, a step S1604 discriminates whether the reflection factor distribution Rn of each light metering signal is equal to or larger than 1/M (corresponding to the average of the reflection factor distribution Rn of the effective light metering areas). If the result is affirmative, namely if said reflection factor distribution is at least equal to the average, the sequence proceeds to a step S1605 to advance the light modulating level LV by 0.02. On the other hand, if the discrimination in the step S1604 turns out negative, namely if the reflection factor distribution Rn of the light metering area is less than the average value, the sequence proceeds to a step S1606 to advance the light modulating level by $0.02 \times Rn/MAX(R)$, wherein MAX(R) is the maximum value of R1-R5.

The above-explained procedure is to bring the light modulating level LV to $0.02 \times 5 = 0.1$ when five reflection factor distributions are all equal, and determines the light modulating level LV according the number of the effective light metering areas M and the reflection factor distributions Rn. More specifically, the light modulating level becomes smaller as the number of the reflection factor distributions smaller than the average increases, namely when the reflection factor distribution Rn is higher in certain areas than in others and the difference in said distribution becomes larger. Also said light modulating level becomes smaller when the number M of the effective light metering areas becomes smaller.

Since each light metering signal BPn is corrected in the step S13 according to the area of the photosensor elements 13a–13e, the number M of the effective light metering areas depends on the area of the entire effective light metering areas. Therefore the determination of the light modulating level LV according to the size of the effective light metering areas corresponds to the determination of said level according to the number of said effective light metering areas.

Then a step S1608 discriminates whether the determined light modulating level LV is at least equal to a predetermined value (0.03 in this case), and, if so, the sequence proceeds to a step S1610. If not, a step S1609 sets the light modulating level LV at 0.03, and the sequence then proceeds to said step S1610. This sequence sets a lower limit of 0.03 to the light modulating level LV, in order to prevent an under exposure resulting from an excessively low light modulating level LV.

The step S1610 converts the light modulating level LV to a value corresponding to the ISO sensitivity SV, read in the step S2, according to an equation:

$$LV = LV \cdot 2^{-(SV-5)}.$$

Figure 15:
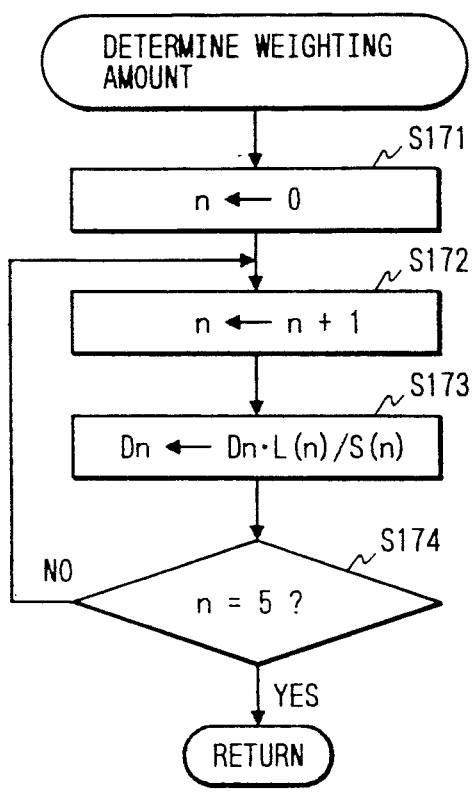

Then the sequence proceeds to a step S17 (FIG. 10) for determining the weights for correcting the light metering signals at the subsequent main light emission. Referring to FIG. 15 showing the details of said step S17, at first a step S171 sets a condition n=0, and steps S172-S174 determine new weights by multiplying the weights Dn corresponding to the light metering signals (Dn being 1 or 0 as determined in the step S14) by L(n)/S(n), wherein L(n) is the lens correction coefficient obtained in the step S13 and S(n) is the area correction coefficient. In the present embodiment, since the light modulating level LV is rendered variable according to the aforementioned reflection factor distributions Rn, the weights need not be varied according to the reflection factor distributions but are determined solely from the lens correction coefficients L(n) and the area correction coefficients S(n). The weights corresponding to the light metering signals excluded in the step S14 are naturally zero.

Then a step S18 (FIG. 10) opens the shutter 10, and, when it is fully opened, causes the electronic flash device 11 to effect the main light emission through the light emission control circuit 36, and a step S19 meters the reflected light from the film surface in divided manner. The illuminating light of the main light emission is reflected by the object, then transmitted by the phototaking lens 2, reflected by the film surface and received by the five photosensor elements 13a–13e, of which output signals are respectively modulating circuit 40 (FIG. 9). Then, in a step S20, the CPU 31 sets the gains of the amplifiers 41a–41e by the gain setters 42a–42e of the light modulating circuit 40 according to the weights Dn determined in the step S17, thereby effecting the weighting.

The amplifiers 41a–41e amplify the output signals of the photosensor elements 13a–13e with thus set gains, and the amplified signals are added in the adding circuit 44. A step S21 sends an integrating signal to the integrating circuit 45, which in response integrates in time the sum obtained from the adding circuit 44.

The light modulating level LV calculated in the step S16 is converted into an analog signal in the converting circuit 46. The output of said converting circuit 46 and the output of said integrating circuit 45 (corresponding to the predetermined light modulation evaluation factor) are supplied to the comparator 47, which sends a light emission stop signal to the CPU 31 when the output of the integrating circuit 45 reaches said light modulating level LV. Upon receiving said light emission stop signal in a step S22, the CPU 31 controls the light emission control circuit 36 in a step S23, thereby terminating the main light emission, and then terminates the sequence.

According to the above-explained procedure, the step S14 extracts the effective light metering areas based on the light metering signals obtained at the preliminary light emission, the aperture value and the phototaking distance, then the step S15 determines the reflection factor distributions in said effective light metering areas, and the step S16 determines the light modulating level according to said reflection factor distributions and the number (size) of the effective light metering areas. At the main light emission, it is terminated when the sum of the light metering signals reaches said light modulating level.

As the effective light metering areas are determined in consideration of the aperture value and phototaking distance at the preliminary light emission, an appropriate light modulating level can always be obtained regardless of the exposure conditions at the phototaking operation or of the distance to the main object. Therefore, the main object can be flash photographed with an appropriate exposure, even in the presence of a highly reflective article in the object field.

Also the variation of the light modulating level according to the number (size) of the effective light metering areas provides following advantages.

When the number of the effective light metering areas is few, the sum of the light metering signals at the main light emission (output of the integrating circuit 45) becomes smaller than in a case where said number is larger. If the light modulating level is taken constant regardless of said number, the main object tends to be over or under exposed respectively if said number is smaller or larger. The probability of attaining an appropriate exposure for the main object becomes higher by decreasing or increasing the light modulating level, as explained above, respectively when said number of the effective light metering areas becomes smaller or larger.

Also in the present embodiment, the light modulating level varies according to the reflection factor distributions of the light metering areas. Thus, for example, if the reflection factor distribution of a light metering area containing the main object is higher than that in other light metering areas (in such case the main object tends to be over exposed), the light modulating level is lowered according to the difference in said distributions, so that the main object can be flash photographed with an appropriate exposure. On the other hand, when the reflection factor distributions are uniform, the light modulating level LV becomes higher, thereby preventing under exposure. Furthermore, if the determined light modulating level is lower than a predetermined value, it is corrected to said predetermined value, thereby preventing the underexposure situation resulting from an excessively low light modulating level.

In the camera of the foregoing embodiment capable of a preliminary light emission and a main light emission, the effective light metering areas are extracted from the plural light metering areas based on the light metering signals obtained at the preliminary light emission and the diaphragm aperture and phototaking distance of the phototaking lens at said preliminary light emission. The main light emission is terminated according to the light metering signals obtained in said effective light metering areas. It is therefore rendered possible to exactly extract the effective light metering areas regardless of the diaphragm aperture and phototaking distance of the phototaking lens at the preliminary light emission, and to effect the light modulation without the influence of the light metering signals resulting, for example, from a highly reflective article or an article closer than the main object, thereby reliably giving an appropriate exposure to the main object.

Also in the camera capable of a preliminary light emission and a main light emission, the light modulating level for terminating the main light emission is determined according to the reflection factor distributions of the light metering areas obtained in the preliminary light emission, so that the main object can always be flash photographed with an appropriate exposure, regardless of the levels of the reflection factor distributions.

Figure 16:
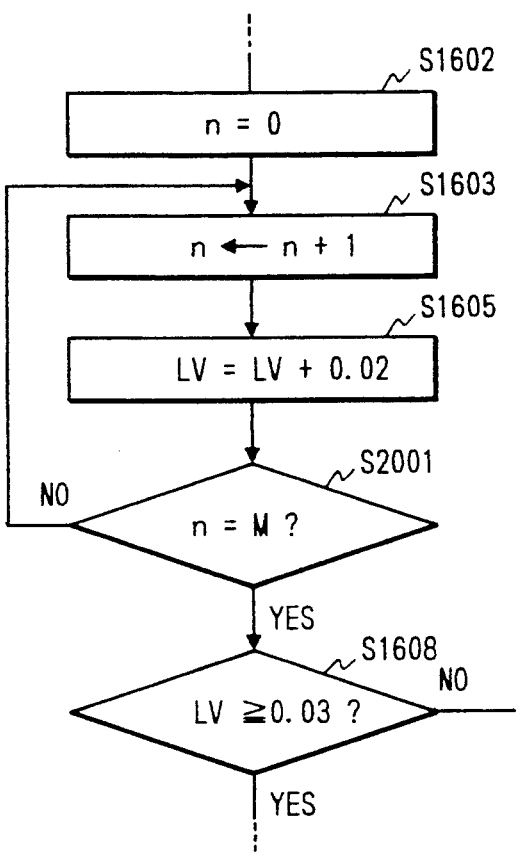
FIG. 16 is a flow chart of the control sequence of a second embodiment which is a variation of the flow chart shown in FIG. 14.

In the following there will be explained a second embodiment of the present invention with reference to FIG. 16. In the foregoing embodiment, the light modulating level LV is determined according to the reflection factor distributions Rn of the light metering areas and the number (size) M of the effective light metering areas, but it may also be determined by said number, disregarding said distributions. In such case, the procedure for calculating the reflection factor distributions shown in FIG. 13 is omitted, and the steps S1602–S1608 in FIG. 14 are modified as shown in FIG. 16. In this case the light modulating level LV is defined by $0.02 \times M$, and is determined solely by the number (size) of the effective light metering areas.

In the camera of the present embodiment capable of a preliminary light emission and a main light emission, the effective light metering areas are extracted according to the light metering signals obtained at the preliminary light emission, and the light modulating level is determined according to the size of said areas, so that the probability of flash photographing the main object with an appropriate exposure is significantly higher than in the conventional camera in which the light modulating level is constant.

In the following there will be explained a third embodiment of the present invention with reference to FIG. 17. In the foregoing embodiments there has been explained a correction of the light modulating level to a predetermined value if said level is lower than said value. In the embodiment shown in FIG. 17, the light modulating level is corrected to a predetermined value or lower if it is higher than said predetermined value.

Figure 17:
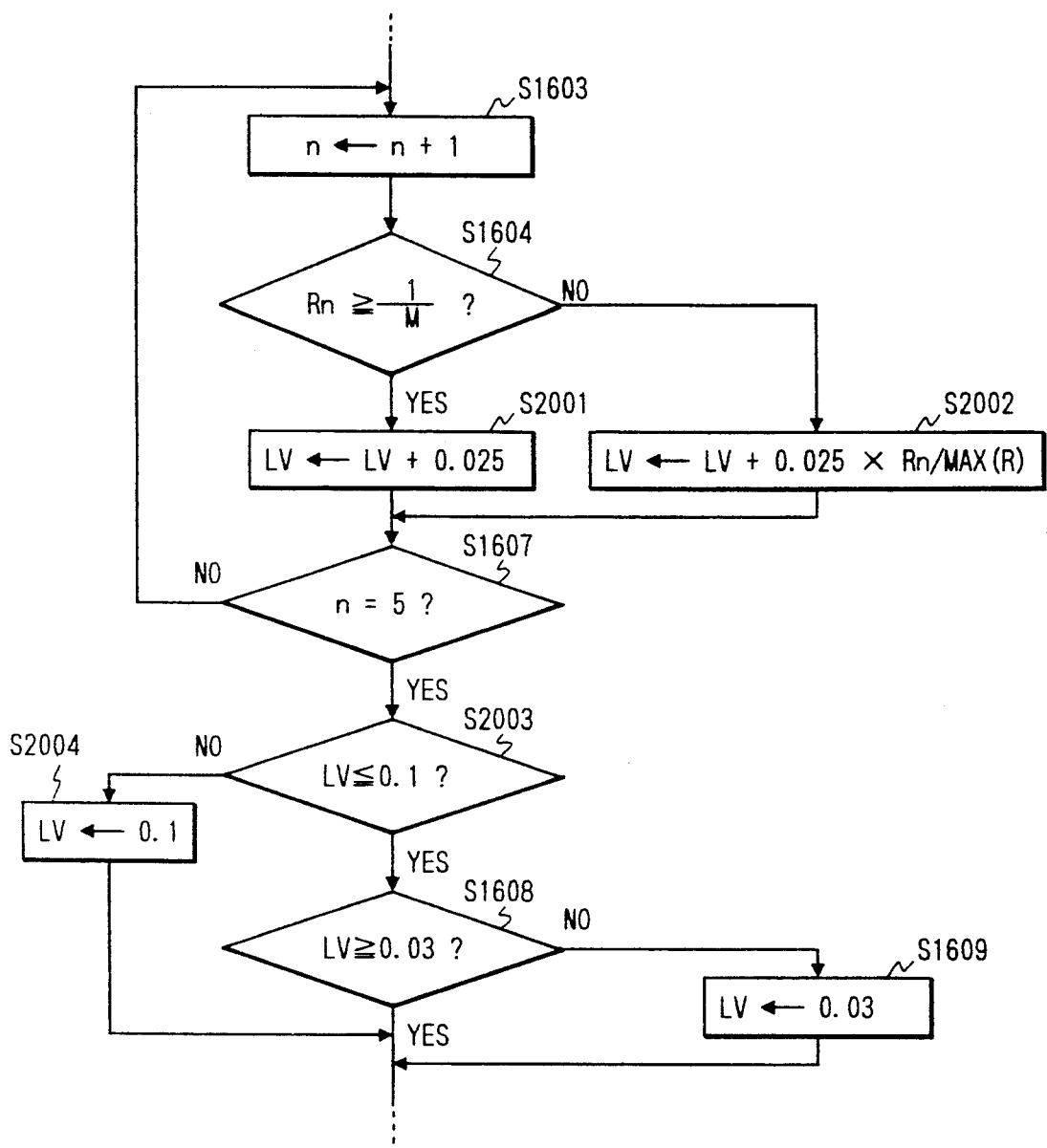
FIG. 17 is a flow chart of the control sequence of a third embodiment which is a variation of the flow chart shown in FIG. 14.

In FIG. 17, the steps S1605 and S1606 in FIG. 14 are changed to steps S2001 and S2002, and steps S2003 and S2004 are added between the steps S1607 and S1608. Thus, if the discrimination in the step S1604 turns out affirmative, the step S2001 increases the light modulating level LV by 0.025 (0.02 in case of FIG. 14), and, if said discrimination turns out negative, the step S2002 increases said level by $0.025 \times Rn/MAX(R)$. Thus the determined light modulating level will have a maximum value of 0.125. Then the step S2003 discriminates whether the light modulating level is at maximum equal to 0.1, and, if so, the sequence proceeds to the step S1608 but, if not, the sequence proceeds to the step S2004 to correct the light modulating level to 0.1.

In the camera of the present embodiment capable of a preliminary light emission and a main light emission, since the light modulating level is determined from the light metering signals obtained at the preliminary light emission, so that the probability of giving an appropriate exposure to the main object at the flash photographing operation is higher than in the conventional camera in which the light modulating level is taken constant. Said probability is further increased since the determined light modulating level is corrected to a predetermined range if it is outside said range.

The above-explained procedure limits the light modulating level within a range of 0.03-0.1. Consequently, in addition to the aforementioned advantages, there is further obtained an advantage of preventing an overexposure resulting from an excessively high light modulating level.

In the foregoing embodiments, the light modulating level is regulated to obtain an appropriate exposure, but similar effects can be also obtained by suitably varying the gain of the integrating circuit 45 or the amplifiers 41a-41e (FIG. 9) for processing the light metering signals obtained at the main light emission, according to the light metering signals obtained from the effective light metering areas at the preliminary light emission. Consequently the determination of the light modulating level used in the present specification includes such regulation of the gain of the integrating circuit or the amplifiers. In such case, the light modulating level is maintained constant at the main light emission, while the light metering signals of the light metering areas are synthesized through the integrating circuit or the amplifiers of the gains determined as explained above, and the main light emission is terminated when said synthesized output reaches said constant light modulating level.

Though the foregoing embodiments have been limited to cameras capable of preliminary light emission, the present invention is likewise applicable to a camera without preliminary light emission. In such case the effective light metering areas are extracted according to the light metering signals obtained at an initial stage of the main light emission. Then the light modulating level or the weights are determined according to the light metering signals obtained in said effective light metering areas, and the light emission is terminated based on these data and the light metering signals obtained after said initial stage.

It is also possible to extract the effective light metering areas according to the light metering signals obtained in an initial stage of the (main) light emission, to determine the light modulating level as explained before according to the size (number) of said effective light metering areas, and to terminate the light emission when the light modulation evaluation factor, cumulatively calculated from the light metering signals obtained after said initial stage of the light emission, reaches said determined light modulating level.

It is furthermore possible to calculate the reflection factor distributions of the light metering areas based on the light metering signals obtained in an initial stage of the (main) light emission, then to determine the light modulating level as explained before according to thus calculated reflection factor distributions, and to terminate the light emission when the light modulation evaluation factor, cumulatively calculated from the light metering signals obtained after said initial stage of the light emission, reaches said determined light modulating level.

It is furthermore possible to determine the light modulating level according to the light metering signals obtained in an initial stage of the (main) light emission, to correct said light modulating level to a predetermined range, as explained before, if said level is outside said range, and to terminate the light emission when the light modulation evaluation factor, cumulatively calculated from the light metering signals obtained after said initial stage of the light emission, reaches said determined or corrected light modulating level.

In the foregoing embodiments, the light modulating level is regulated to obtain an appropriate exposure, but similar effects can be also obtained by suitably varying the gain of the integrating circuit 45 or the amplifiers 41a-41e (FIG. 9) for processing the light metering signals obtained in the main light emission, according to the light metering signals obtained from the effective light metering areas in an initial stage of the light emission. Consequently the determination of the light modulating level, used in the present specification, includes such regulation of the gain of the integrating circuit of the amplifiers.

In the foregoing embodiments, the light modulating level LV is determined from the reflection factor distributions Rn of the light metering areas and the number (size) of the effective light metering areas, but there will be explained in the following an embodiment of determining the light modulating level based solely on the reflection factor distributions, disregarding said number M. In this case the subroutine in FIG. 12 is omitted, and the reflection factor distributions Rn for all the five light metering areas are determined by the subroutine shown in FIG. 13. Thus all the five areas are used as the effective areas. Consequently the value 1/M in the step S1604 in FIG. 14 is fixed as 0.2, so that the light modulating level LV is determined solely by the reflection factor distributions of the areas.

Also the extraction of the effective light metering areas is conducted in consideration of the aperture value and phototaking distance in addition to the light metering signals at the preliminary light emission, but said extraction may also be conducted according to said light metering signals only.

Furthermore, the foregoing explanation has been limited to cameras utilizing a silver halide-based photographic film, but the present invention is likewise applicable for example to an electronic still camera utilizing a floppy disk.

I claim:

1. An automatic light modulating camera capable of a flash phototaking operation with a preliminary light emission followed by a main light emission, comprising:

light metering means for metering reflected light from each of plural areas divided in an object field at said preliminary and main light emissions and outputting corresponding light metering signals;

area extracting means for extracting effective light metering areas from said plural areas, based on the light metering signals obtained at said preliminary light emission and on lens signals indicating the phototaking state of a phototaking lens at said preliminary light emission; and light modulating means for terminating said main light emission, according to the light metering signals obtained in said effective light metering areas.

2. An automatic light modulating camera according to claim 1, wherein said lens signals include the aperture value and the phototaking distance of the phototaking lens.

3. An automatic light modulating camera according to claim 1, wherein said light modulating means includes a gain-adjustable processing circuit for synthesizing the light metering signals obtained at said main light emission, based on the light metering signals obtained from said effective light metering areas at said preliminary light emission, and wherein said light modulating means terminates said main light emission when the sum of said light metering signals synthesized by said processing circuit reaches a predetermined light modulating level.

4. An automatic light modulating camera according to claim 3, wherein said processing circuit comprises amplifiers for amplifying said light metering signals, and an integrating circuit for synthesizing said light metering signals as amplified by said amplifiers.

5. An automatic light modulating camera according to claim 1, wherein said light modulating means is adapted to determine a relationship, to be used for terminating the main light emission, between the sum of said light metering signals and the light modulating level, based on the light metering signals obtained from said effective light metering areas at said preliminary light emission, and to terminate said main light emission when said sum and said light modulating level reach said relationship.

6. An automatic light modulating camera according to claim 1, further comprising weighting means for weighting the light metering signals of said effective light metering areas, wherein the weights include weights corresponding to the exit pupil distance of the phototaking lens.

7. An automatic light modulating camera according to claim 1, wherein said light metering means has photosensors each producing a light metering signal for a corresponding one of said plural areas, said light modulating means has amplifiers each corresponding to one of said photosensors and amplifying the light metering signal therefrom, and gains of said amplifiers are changed on the basis of the light metering signals of said effective light metering areas obtained at said preliminary light emission.

8. An automatic light modulating camera according to claim 1, wherein said light metering means has photosensors each producing a light metering signal for a corresponding one of said plural areas, said light modulating means has an adding circuit for combining light metering signals from each of said photosensors and an integrating circuit for integrating an output from said adding circuit, and a gain of said integrating circuit is changed on the basis of the light metering signals of said effective light metering areas obtained at said preliminary light emission.

9. An automatic light modulating camera capable of a flash phototaking operation with a flash light emission, comprising:

light metering means for metering reflected flash light from each of plural areas divided in an object field at said light emission and outputting corresponding light metering signals;

area extracting means for extracting effective light metering areas from said plural areas, based on the light metering signals obtained in an initial stage of said light emission and on lens signals indicating the phototaking state of a phototaking lens at said light emission; and light modulating means for terminating said light emission, according to the light metering signals obtained in said effective light metering areas extracted by said area extracting means.

10. An automatic light modulating camera according to claim 9, wherein said lens signals include the aperture value and the phototaking distance of the phototaking lens.

11. An automatic light modulating camera according to claim 9, wherein said light modulating means includes a gain-adjustable processing circuit for synthesizing the light metering signals obtained at said light emission, based on the light metering signals obtained from said effective light metering areas in the initial stage of said light emission, and wherein said light modulating means terminates said light emission when the sum of said light metering signals synthesized by said processing circuit reaches a predetermined light modulating level.

12. An automatic light modulating camera according to claim 11, wherein said processing circuit comprises amplifiers for amplifying said light metering signals, and an integrating circuit for synthesizing said light metering signals as amplified by said amplifiers.

13. An automatic light modulating camera according to claim 9, wherein said light modulating means is adapted to determine a light modulating level for terminating said light emission, based on the light metering signals obtained from said effective light metering areas in an initial stage of said light emission, and to terminate said light emission when the sum of said light metering signals at said light emission reaches said light modulating level.

14. An automatic light modulating camera according to claim 9, further comprising weighting means for weighting the light metering signals of said effective light metering areas, wherein the weights include weights corresponding to the exit pupil distance of the phototaking lens.

15. An automatic light modulating camera according to claim 9, wherein said light metering means has photosensors each producing a light metering signal for a corresponding one of said plural areas, said light modulating means has amplifiers each corresponding to one of said photosensors and amplifying the light metering signal therefrom, and gains of said amplifiers are changed on the basis of the light metering signals of said effective light metering areas obtained at said initial stage of said light emission.

16. An automatic light modulating camera according to claim 9, wherein said light metering means has photosensors each producing a light metering signal for a corresponding one of said plural areas, said light modulating means has an adding circuit for combining light metering signals from each of said photosensors and an integrating circuit for integrating an output from said adding circuit, and a gain of said integrating circuit is changed on the basis of the light metering signals of said effective light metering areas obtained at said initial stage of said light emission.

17. An automatic light modulating camera capable of a flash phototaking operation with a preliminary light emission followed by a main light emission, comprising:
 light metering means for metering reflected light from each of plural areas divided in an object field at said preliminary and main light emissions and outputting corresponding light metering signals:
 area extracting means for extracting effective light metering areas from said plural areas, based on the light metering signals obtained at said preliminary light emission and on lens signals indicating the phototaking state of a phototaking lens at said preliminary light emission; and
 light modulating means for determining a relationship, to be used for terminating said main light emission, between a predetermined light modulation evaluation factor to be cumulatively calculated from the light metering signals of said effective light metering areas and the light modulating level, based on the size of said effective light metering areas extracted by said area extracting means, and terminating said main light emission when said predetermined light modulation evaluation factor and said light modulating level reach said relationship.

18. An automatic light modulating camera according to claim 17 wherein said light modulating means is adapted to vary said light modulating level according the size of said effective light metering areas.

19. An automatic light modulating camera according to claim 17, wherein said light modulating means comprises amplifiers and an integrating circuit for processing the light metering signals of said effective light metering areas, and is adapted to vary one of the gain of said amplifiers and the gain of said integrating circuit according to the size of said effective light metering areas, thereby varying said predetermined light modulation evaluation factor.

20. An automatic light modulating camera according to claim 17 wherein the size of said effective light metering areas depends on the number thereof.

21. An automatic light modulating camera according to claim 17, wherein said lens signals include the aperture value and the phototaking distance of the phototaking lens.

22. An automatic light modulating camera according to claim 17, further comprising weighting means for weighting the light metering signals of said effective light metering areas, wherein the weights include weights corresponding to the exit pupil distance of the phototaking lens.

23. An automatic light modulating camera according to claim 17, wherein said light metering means has photosensors each producing a light metering signal for a corresponding one of said plural areas, said light modulating means has amplifiers each corresponding to one of said photosensors and amplifying the light metering signal therefrom, and gains of said amplifiers are changed according to the size of said effective light metering areas to vary said predetermined light modulation evaluation factor.

24. An automatic light modulating camera according to claim 17, wherein said light metering means has photosensors each producing a light metering signal for a corresponding one of said plural areas, said light modulating means has an adding circuit for combining light metering signals from each of said photosensors and an integrating circuit for integrating an output from said adding circuit, and a gain of said integrating circuit is changed according to the size of said effective light metering areas to vary said predetermined light modulation evaluation factor.

25. An automatic light modulating camera capable of a flash phototaking operation with a flash light emission, comprising:
 light metering means for metering reflected flash light from each of plural areas divided in an object field at said light emission and outputting corresponding light metering signals;
 area extracting means for extracting effective light metering areas from said plural areas, based on the light metering signals obtained in an initial stage of said light emission and on lens signals indicating the phototaking state of a phototaking lens at said light emission; and
 light modulating means for determining a relationship, to be used for terminating said light emission, between a predetermined light modulation evaluation factor to be cumulatively calculated from the light metering signals of said effective light metering areas and the light modulating level, based on the size of said effective light metering areas, and terminating said light emission when said predetermined light modulation evaluation factor and said light modulating level reach said relationship after said initial stage of the light emission.

26. An automatic light modulating camera according to claim 25, wherein said light modulating means is adapted to vary said light modulating level according the size of said effective light metering areas.

27. An automatic light modulating camera according to claim 25, wherein said light modulating means comprises amplifiers and an integrating circuit for processing the light metering signals of said effective light metering areas, and is adapted to vary one of the gain of said amplifiers and the gain of said integrating circuit according to the size of said effective light metering areas, thereby varying said predetermined light modulation evaluation factor.

28. An automatic light modulating camera according to claim 25, wherein the size of said effective light metering areas depends on the number thereof.

29. An automatic light modulating camera according to claim 25, wherein said lens signals include the aperture value and the phototaking distance of the phototaking lens.

30. An automatic light modulating camera according to claim 25, further comprising weighting means for weighting the light metering signals of said effective light metering, areas, wherein the weights include weights corresponding to the exit pupil distance of the phototaking lens.

31. An automatic light modulating camera according to claim 25, wherein said light metering means has photosensors each producing a light metering signal for a corresponding one of said plural areas, said light modulating means has amplifiers each corresponding to one of said photosensors and amplifying the light metering signal therefrom, and gains of said amplifiers are changed according to the size of said effective light metering areas to change said predetermined light modulation evaluation factor.

32. An automatic light modulating camera according to claim 25 wherein said light metering means has photosensors each producing a light metering signal for a corresponding one of said plural areas, said light modulating means has an adding circuit for combining light metering signals from each of said photosensors and an integrating circuit for integrating an output from said adding circuit, and a gain of said integrating circuit is changed according to the size of said effective light metering areas to vary said predetermined light modulation evaluation factor.

33. An automatic light modulating camera capable of a flash phototaking operation with a preliminary light emission followed by a main light emission, comprising:
light metering means for metering reflected light from each of plural areas divided in an object field at said preliminary and main light emissions and outputting corresponding light metering signals;
reflection factor distribution calculating means for calculating the reflection factor distributions of said plural areas of the object field based on the light metering signals obtained at said preliminary light emission; and
light modulating means for determining a relationship, to be used for terminating said main light emission, between a predetermined light modulation evaluation factor to be cumulatively calculated from the light metering signals of said plural areas and the light modulation level, based on said reflection factor distributions calculated by said reflection factor distribution calculating means, and terminating said main light emission when said predetermined light modulation evaluation factor and said light modulation level reach said relationship.

34. An automatic light modulating camera according to claim 20, wherein said light modulating means is adapted to vary said light modulating level according to said reflection factor distributions.

35. An automatic light modulating camera according to claim 33, wherein said light modulating means comprises amplifiers and an integrating circuit for processing the light metering signals of said plural areas, and is adapted to vary one of the gain of said amplifiers and the gain of said integrating circuit according to said reflection factor distributions, thereby varying said predetermined light modulation evaluation factor.

36. An automatic light modulating camera according to claim 33, further comprising weighting means for weighting the light metering signals of said plural areas, wherein the weights include weights corresponding to the exit pupil distance of a phototaking lens.

37. An automatic light modulating camera according to claim 33, wherein said light metering means has photosensors each producing a light metering signal for a corresponding one of said plural areas, said light modulating means has amplifiers each corresponding to one of said photosensors and amplifying the light metering signal therefrom, and gains of said amplifiers are changed according to said reflection factor distributions to vary said predetermined light modulation evaluation factor.

38. An automatic light modulating camera according to claim 33, wherein said light metering means has photosensors each producing a light metering signal for a corresponding one of said plural areas, said light modulating means has an adding circuit for combining light metering signals from each of said photosensors and an integrating circuit for integrating an output from said adding circuit, and a gain of said integrating circuit is changed according to said reflection factor distributions to vary said predetermined light modulation evaluation factor.

39. An automatic light modulating camera capable of a flash phototaking operation with a flash light emission, comprising:
light metering means for metering reflected flash light from each of plural areas divided in an object field at said light emission and outputting corresponding light metering signals;
reflection factor distribution calculating means for calculating the reflection factor distributions of said plural areas of the object field, based on the light metering signals obtained in an initial stage of the light emission; and
light modulating means for determining a relationship, to be used for terminating said light emission, between a predetermined light modulation evaluation factor to be cumulatively calculated from the light metering signals of said plural areas and the light modulating level, based on said reflection factor distributions calculated by said reflection factor distribution calculating means, and terminating said light emission when said predetermined light modulation evaluation factor and said light modulating level reach said relationship after said initial stage of light emission.

40. An automatic light modulating camera according to claim 39, wherein said light modulating means is adapted to vary said light modulating level according to said reflection factor distributions.

41. An automatic light modulating camera according to claim 39, wherein said light modulating means comprises amplifiers and an integrating circuit for processing the light metering signals of said plural areas, and is adapted to vary one of the gain of said amplifiers and the gain of said integrating circuit according to said reflection factor distributions, thereby varying said predetermined light modulation evaluation factor.

42. An automatic light modulating camera according to claim 39, further comprising weighting means for weighting the light metering signals of said plural areas, wherein the weights includes weights corresponding to the exit pupil distance of a phototaking lens.

43. An automatic light modulating camera according to claim 39, wherein said light metering means has photosensors each producing a light metering signal for a corresponding one of said plural areas, said light modulating means has amplifiers each corresponding to one of said photosensors and amplifying the light metering signal therefrom, and gains of said amplifiers are changed according to said reflection factor distributions to vary said predetermined light modulation evaluation factor.

44. An automatic light modulating camera according to claim 39, wherein said light metering means has photosensors each producing a light metering signal for a corresponding one of said plural areas, said light modulating means has an adding circuit for combining light metering signals from each of said photosensors and an integrating circuit for integrating an output from said adding circuit, and a gain of said integrating circuit is changed according to said reflection factor distributions to vary said predetermined light modulation evaluation factor.

45. An automatic light modulating camera capable of a flash phototaking operation with a preliminary light emission followed by a main light emission, comprising:
light metering means for metering reflected light from each of plural areas divided in an object field at said preliminary and main light emissions and outputting corresponding light metering signals;
area extracting means for extracting effective light metering areas from said plural areas, based on the light metering signals obtained at said preliminary light emission and on lens signals indicating the phototaking state of a phototaking lens at said preliminary light emission;
reflection factor distribution calculating means for calculating the reflection factor distributions of said extracted effective light metering areas; and
light modulating means for determining a relationship, to be used for terminating said main light emission, between a predetermined light modulation evaluation factor to be cumulatively calculated from the light metering signals of said effective light metering areas and the light modulating level, based on the size and said reflection factor distributions of said effective light metering areas extracted by said area extracting means, and terminating said main light emission when said predetermined light modulation evaluation factor and said light modulating level reach said relationship.

46. An automatic light modulating camera according to claim 45, wherein said light modulating means is adapted to vary said light modulating level according to the size and said reflection factor distributions of said effective light metering areas.

47. An automatic light modulating camera according to claim 45, wherein said light modulating means comprises amplifiers and an integrating circuit for processing the light metering signals of said effective light metering areas, and is adapted to vary one of the gain of said amplifiers and the gain of said integrating circuit according to the size and said reflection factor distributions of said effective light metering areas, thereby varying said predetermined light modulation evaluation factor.

48. An automatic light modulating camera according to claim 45, further comprising weighting means for weighting the light metering signals of said effective light metering areas, wherein the weights include weights corresponding to the exit pupil distance of a phototaking lens.

49. An automatic lights modulating camera according to claim 45, wherein said light metering means has photosensors each producing a light metering signal for a corresponding one of said plural areas, said light modulating means has amplifiers each corresponding to one of said photosensors and amplifying the light metering signal therefrom, and gains of said amplifiers are changed according to the size of said effective light metering areas and said reflection factor distributions to vary said predetermined light modulation evaluation factor.

50. An automatic light modulating camera according to claim 45, wherein said light metering means has photosensors each producing a light metering signal for a corresponding one of said plural areas, said light modulating means has an adding circuit for combining light metering signals from each of said photosensors and an integrating circuit for integrating an output from said adding circuit, and a gain of said integrating circuit is changed according to the size of said effective light metering areas and said reflection factor distributions to vary said predetermined light modulation evaluation factor.

51. An automatic light modulating camera capable of a flash phototaking operation with a flash light emission, comprising:
light metering means for metering reflected flash light from each of plural areas divided in an object field at said light emission, and outputting corresponding light metering signals;
area extracting means for extracting effective light metering areas from said plural areas, based on the light metering signals obtained in an initial stage of said light emission and on lens signals indicating the phototaking state of a phototaking lens at said light emission;
reflection factor distribution calculating means for calculating the reflection factor distributions of said extracted effective light metering areas; and
light modulating means for determining a relationship, to be used for terminating said light emission, between a predetermined light modulation evaluation factor to be cumulatively calculated from the light metering signals of said effective light metering areas and the light modulating level, based on the size and said reflection factor distributions of said effective light metering areas, and terminating said light emission when said predetermined light modulation evaluation factor and said light modulating level reach said relationship, after said initial stage of light emission.

52. An automatic light modulating camera according to claim 51, wherein said light modulating means is adapted to vary said light modulating level according to the size and said reflection factor distributions of said effective light metering areas.

53. An automatic light modulating camera according to claim 51, wherein said light modulating means comprises amplifiers and an integrating circuit for processing the light metering signals of said effective light metering areas, and is adapted to vary one of the gain of said amplifiers and the gain of said integrating circuit according to the size and said reflection factor distributions of said effective light metering areas, thereby varying said predetermined light modulation evaluation factor.

54. An automatic light modulating camera according to claim 51, further comprising weighting means for weighting the light metering signals of said effective light metering areas, wherein the weights include weights corresponding to the exit pupil distance of a phototaking lens.

55. An automatic light modulating camera according to claim 51, wherein said light metering means has photosensors each producing a light metering signal for a corresponding one of said plural areas, said light modulating means has amplifiers each corresponding to one of said photosensors and amplifying the light metering signal therefrom, and gains of said amplifiers are changed according to the size of said effective light metering areas and said reflection factor distributions to vary said predetermined light modulation evaluation factor.

56. An automatic light modulating camera according to claim 31, wherein said light metering means has photosensors each producing a light metering signal for a corresponding one of said plural areas, said light modulating means has an adding circuit for combining light metering signals from each of said photosensors and an integrating circuit for integrating an output from said adding circuit, and a gain of said integrating circuit is changed according to the size of said effective light metering areas and said reflection factor distributions to vary said predetermined light modulation evaluation factor.

57. An automatic light modulating camera capable of a flash phototaking operation with a preliminary light emission followed by a main light emission, comprising:
light metering means for metering reflected light from each of plural areas divided in an object field at said preliminary and main light emissions and outputting corresponding light metering signals;
level determination means for determining a light modulating level, based on the light metering signals obtained at said preliminary light emission;
level correction means for correcting said determining light modulating level into a predetermined range if said level is outside said range; and
light modulating means for terminating said main light emission when a predetermined light modulation evaluation factor, to be cumulatively calculated from said light metering signals at said main light emission, reaches said determined light modulating level if that level is in said range, or reaches said corrected light modulating level if said determined light modulating level is outside said range.

58. An automatic light modulating camera according to claim 57, further comprising weighting means for weighting the light metering signals of said plural areas, wherein the weights include weights corresponding to the exit pupil distance of a phototaking lens.

59. An automatic light modulating camera capable of a flash phototaking operation with a flash light emission, comprising:
light metering means for metering reflected flash light from each of plural areas divided in an object field at said light emission, and outputting corresponding light metering signals;
level determination means for determining a light modulating level, based on the light metering signals obtained in an initial stage of said light emission;
level correction means for correcting said determined light modulating level into a predetermined range if said level is outside said range; and
light modulating means for terminating said light emission when a predetermined light modulation evaluation factor, to be cumulatively calculated from said light metering signals, reaches said determined light modulating level if that level is in said range, or reaches said corrected light modulating level if said determined light modulating level is outside said range.

60. An automatic light modulating camera according to claim 59, further comprising weighting means for weighting the light metering signals of said plural areas, wherein the weights include weights corresponding to the exit pupil distance of a phototaking lens.

61. A phototaking lens barrel mountable to an automatic light modulating camera capable of a flash phototaking operation with a preliminary light emission followed by a main light emission, comprising:
detection means for detecting lens signals indicating a phototaking state; and
output means for sending said lens signals to said automatic light modulating camera;
wherein said camera is adapted to extract effective light metering areas to be used at said main light emission from plural areas divided in an object field, based on light metering signals obtained by metering reflected light from said plural areas at said preliminary light emission and on said lens signals at said preliminary light emission.

62. A phototaking lens barrel according to claim 61, wherein said lens signals indicate phototaking distance and aperture value.

* * * * *